(12) United States Patent
Zeitler

(10) Patent No.: US 8,448,610 B1
(45) Date of Patent: May 28, 2013

(54) ANIMAL LEG COVER

(76) Inventor: Jean H. Zeitler, Hoffman Estates, IL (US)

( * ) Notice: Subject to any disclaimer, the term of this patent is extended or adjusted under 35 U.S.C. 154(b) by 177 days.

(21) Appl. No.: 13/113,450

(22) Filed: May 23, 2011

Related U.S. Application Data

(60) Provisional application No. 61/397,410, filed on Jun. 11, 2010.

(51) Int. Cl.
*A01K 13/00* (2006.01)
(52) U.S. Cl.
USPC ............................................. 119/850; 119/856
(58) Field of Classification Search
USPC ............................. 119/850, 856, 863; 128/882
See application file for complete search history.

(56) References Cited

U.S. PATENT DOCUMENTS

| | | | |
|---|---|---|---|
| 6,186,097 B1* | 2/2001 | Brockmann et al. | 119/850 |
| 6,526,920 B1* | 3/2003 | Griffin | 119/850 |
| 7,677,206 B1* | 3/2010 | Southworth | 119/850 |
| 2005/0092260 A1* | 5/2005 | Paxton et al. | 119/850 |
| 2005/0188925 A1* | 9/2005 | Yun et al. | 119/850 |
| 2006/0231045 A1* | 10/2006 | Lindley | 119/856 |
| 2007/0044734 A1* | 3/2007 | Maloney et al. | 119/850 |
| 2007/0074677 A1* | 4/2007 | Behme | 119/850 |
| 2009/0094864 A1* | 4/2009 | Ketzenberg et al. | 36/111 |

* cited by examiner

*Primary Examiner* — Rob Swiatek
*Assistant Examiner* — Kathleen Iwasaki
(74) *Attorney, Agent, or Firm* — Botkin & Hall, LLP

(57) ABSTRACT

An animal leg cover particularly useful for dogs, but may be useful for other pets as well. The cover has a tubular section with an open end, a closed end and an outer surface. The tubular section is made from a material that has a waterproof elastomeric material layer that faces inwardly and a fabric layer bonded to the elastomeric layer facing outwardly. The lower closed end has a gripping portion of elastomeric waterproof material on its outer surface. The tubular section has overlapping flaps that are closed with a zipper. The leg cover provides a waterproof protective barrier that may be worn over a cast or other wound.

5 Claims, 5 Drawing Sheets

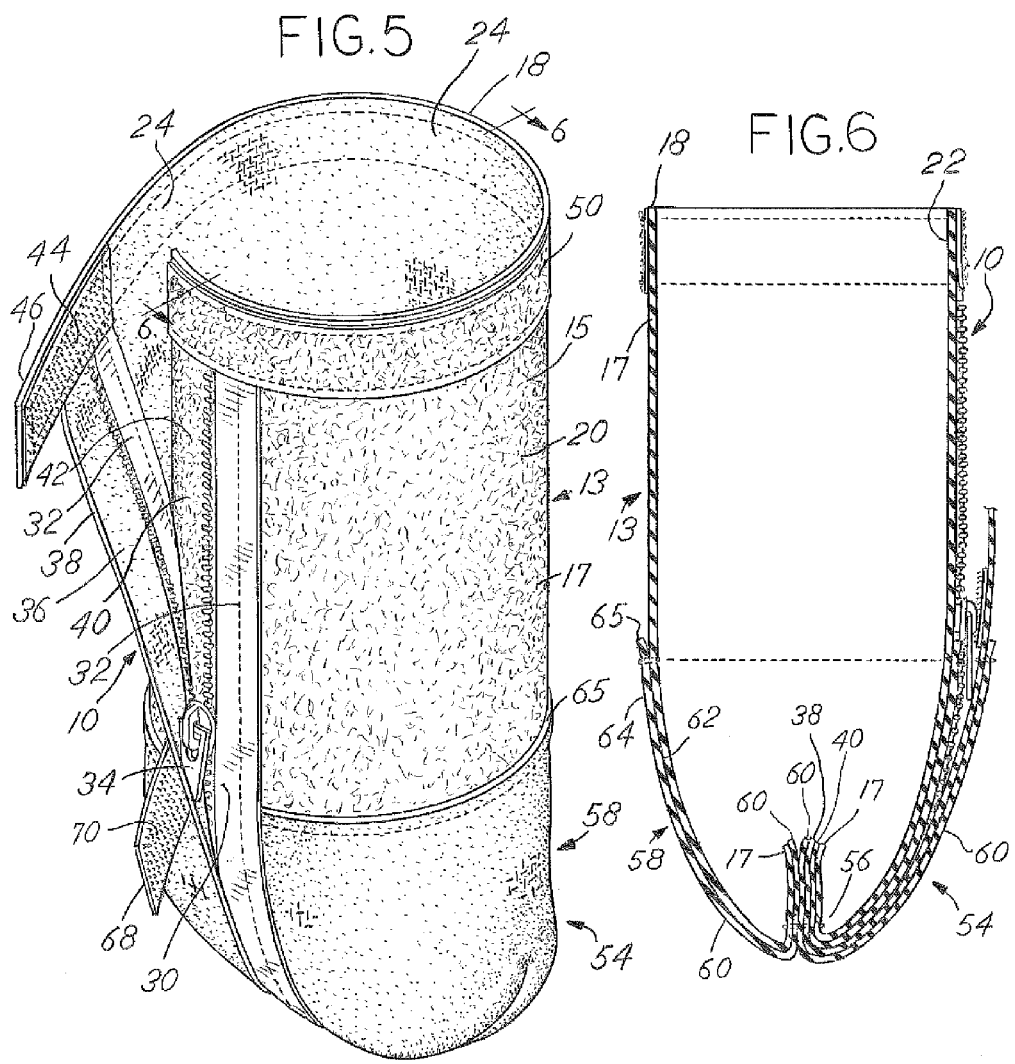

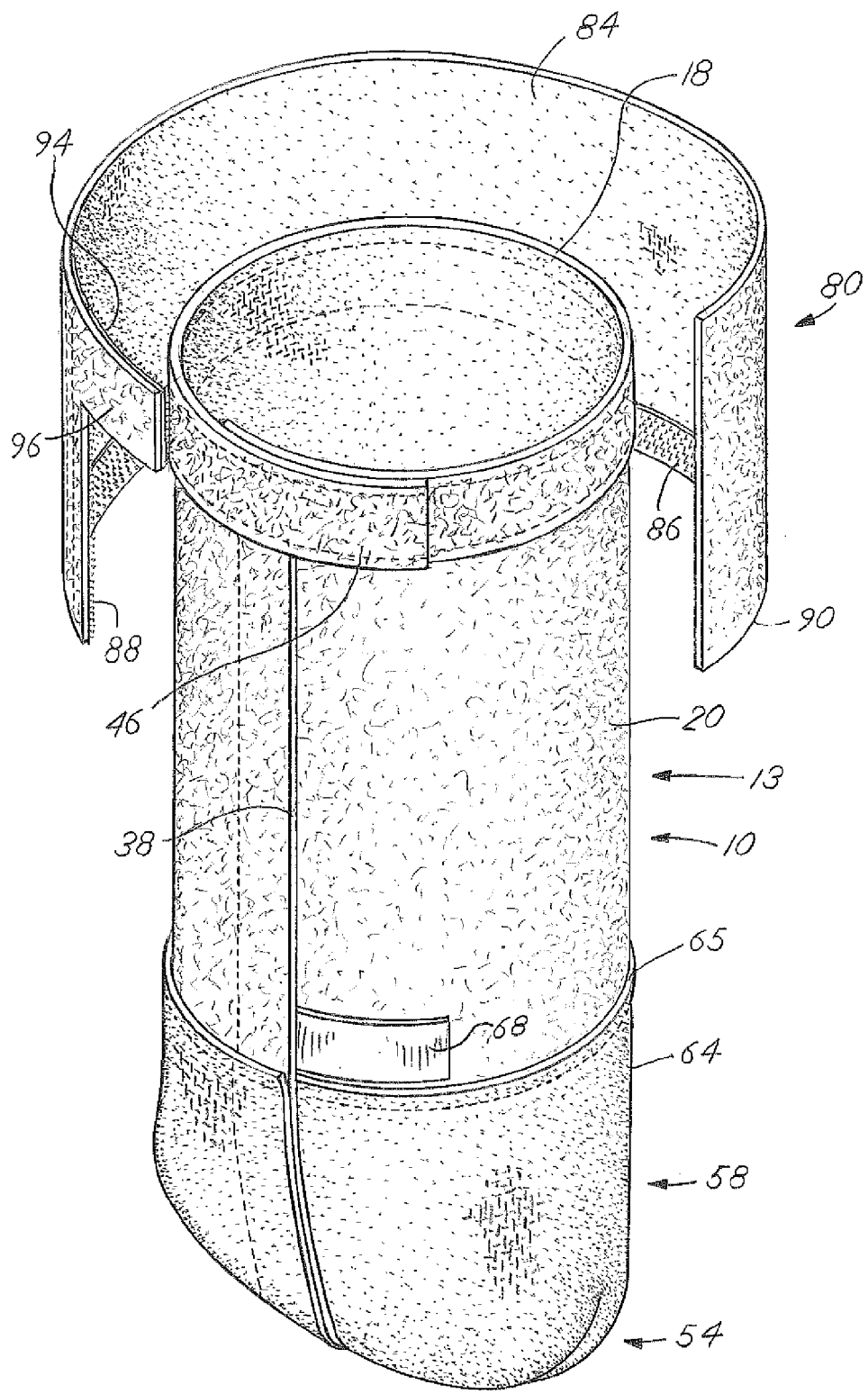

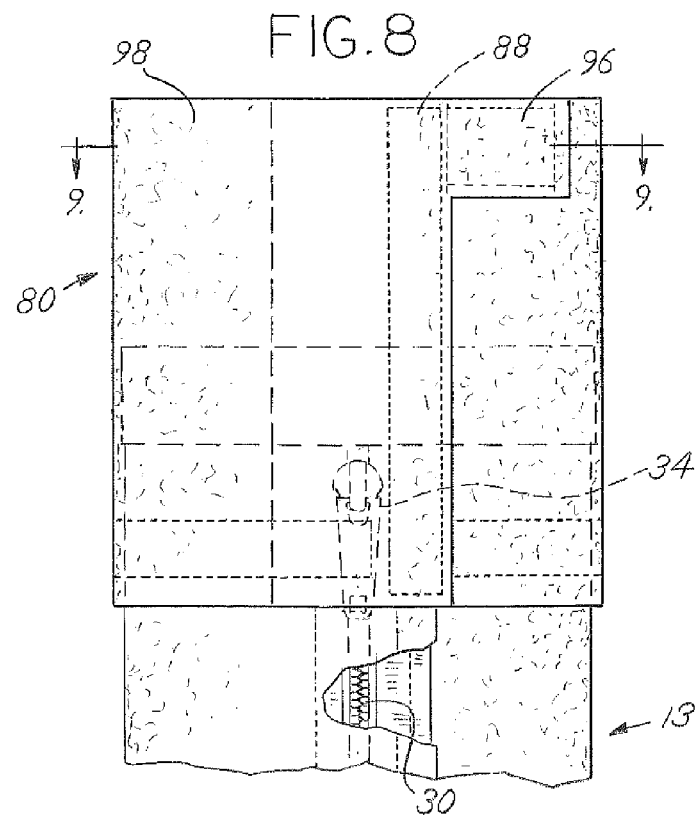
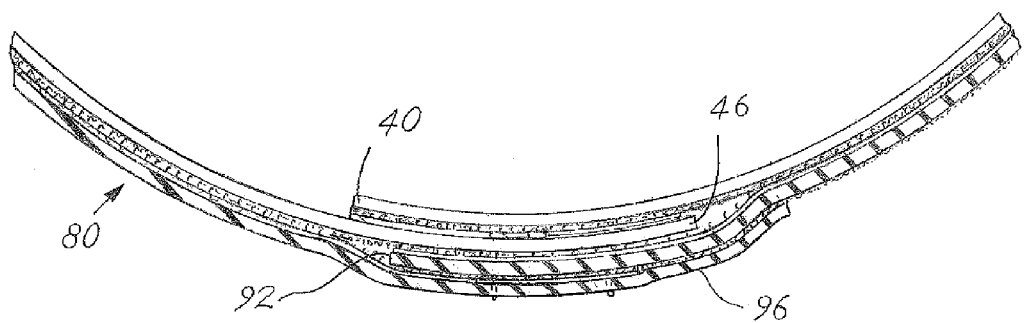

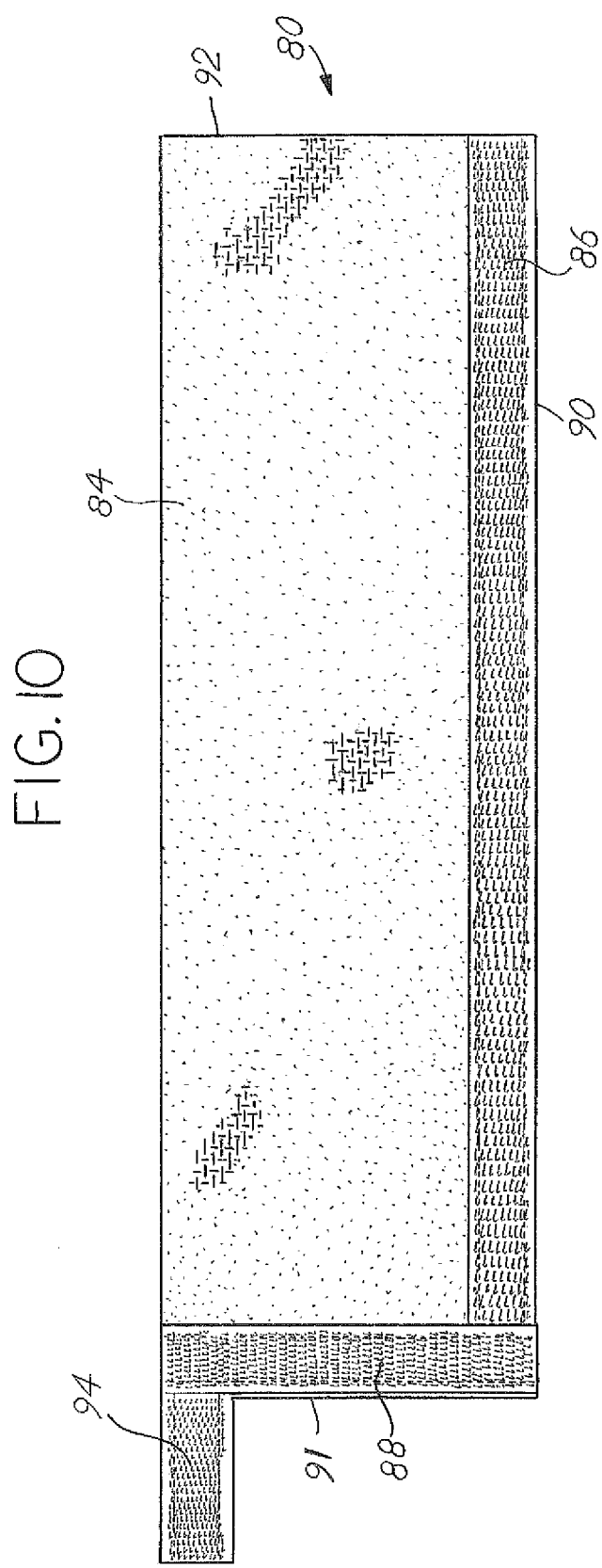

ANIMAL LEG COVER

CROSS REFERENCE TO RELATED APPLICATIONS

This application claims the benefit of U.S. Provisional Application No. 61/397,410, filed Jun. 11, 2010, the disclosure of which is hereby incorporated by reference.

BACKGROUND OF THE INVENTION

Pets, like their owners, may sometimes need a cast or stitches to treat an injury to a leg. Keeping the stitches or cast dry and free of dirt is important throughout the healing process. Animals are particularly susceptible to making such treatment difficult as they often will get their cast or stitches wet and/or dirty. A protective covering would be helpful to prevent this from happening.

Ideally, such a covering would be easily put on, comfortable, and not inhibit the pet's natural movement. Such coverings as plastic bags or other makeshift remedies will fail on these points because they offer little protection and strings or tape used to keep them on can hurt the pet. A soft comfortable covering that is water proof is needed. The covering should also be reusable. The ability to remain on an animal's leg without being too tight is important for good circulation which will promote rapid healing and reduce the need to tend to the wound it covers.

SUMMARY OF THE INVENTION

The present invention is an animal leg cover particularly useful for dogs, but may be useful for other pets, as well. The cover has an elongate tubular section with an open end, a closed end and an outer surface. The tubular section is made from a material that has a waterproof elastomeric material layer that faces inwardly and a fabric layer bonded to the elastomeric layer facing outwardly. The lower closed end has a gripping portion of elastomeric waterproof material on its outer surface. The tubular section has an outer flap that overlaps the inner flap. A zipper with mateable portions is located in the tubular section. One of the mateable portions of the zipper is on an inner surface of the outer flap and the other mateable portion of the zipper is on the outer surface of the inner flap. The outer flap overlaps the inner flap by a distance enough to cover the zipper when the mateable portions of the zipper are joined together. An upper strap is located near the upper end and is adapted for releasably being secured to the tubular section. The strap has an inner surface having a hook fastening device for mating with a corresponding loop fastening device near the upper end of the tubular section. A lower strap is located near the gripping portion and has a hook fastening device for mating with a corresponding loop fastening device. The loop fastening device for the lower strap is the fabric layer on the outer surface of the tubular section.

BRIEF DESCRIPTION OF THE DRAWINGS

FIG. 5 is a perspective view of the leg cover;

FIG. 6 is a sectional view taken about the line 6-6 in FIG. 5;

FIG. 7 is a perspective view of the leg cover shown in FIG. 5 closed with the adjustable collar;

FIG. 8 is a front view of the leg cover with the adjustable collar both being closed;

FIG. 9 is a sectional view taken about the line 9-9 in FIG. 8; and

FIG. 10 is a view showing the adjustable collar opened flatly showing the inner elastomeric layer.

DETAILED DESCRIPTION OF INVENTION

The present invention is an animal leg cover 10 particularly useful for dogs. The cover 10 is typically used when a dog 12 has a wound on a leg 14, or a cast on a leg 14. Ideally, the leg cover 10 would not impede a dog's 12 movement to a large extent so the height on the leg 14 covered should not be above the first joint below the shoulder, or in other words, below the elbow. Other pets could use the leg cover 10, as well.

Figure 1:
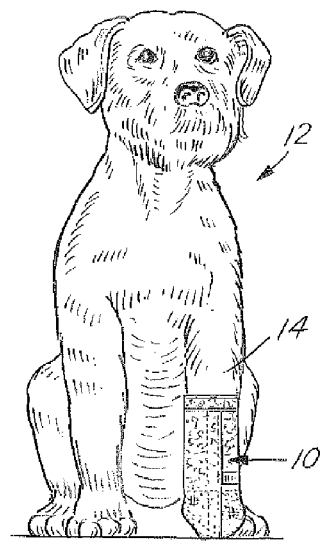
FIG. 1 is a front view of a smaller sized dog using the leg cover.
Figure 2:
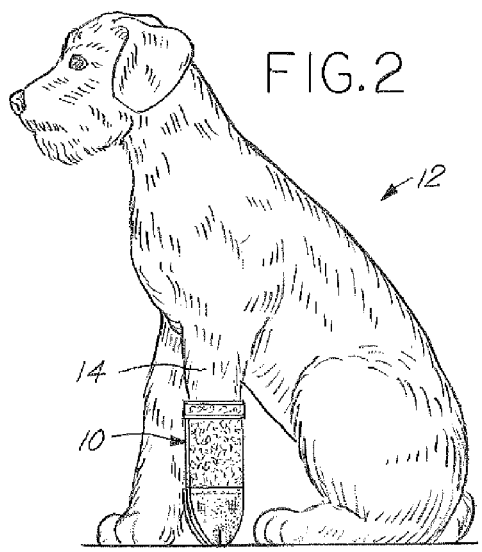
FIG. 2 is a side view of the dog in FIG. 1 using the leg cover.

FIGS. 1 and 2 show a front view and side view of a dog 12 using the leg cover 10. The cover 10 has a tubular section 13 that has an open upper end 18 and a closed lower end. The tubular section 13 is made from material 17 having a fabric layer 15 and an elastomeric layer 24. An outer surface 20 of the tubular section 13 has the fabric layer 15 and an inner surface 22 of the tubular section as the elastomeric layer 24. The elastomeric layer 24 is neoprene that provides a soft contact with the leg 14 and prevents the cover 14 from slipping off the leg 14. The elastomeric layer 24 prevents water from getting inside the cover 10.

The front of the tubular section has a zipper 30 with mateable portions 32 that join together with the use of a zipper pull 34. One of the mateable portions 32 is on an inside surface 36 of an outer flap 38. The other mateable portion 32 is on an outer surface 42 of the inner flap 40. The outer flap 38 overlaps an inner flap 40 by a distance large enough to cover both of the mateable portions 32 of the zipper 30 when the zipper 30 is closed.

The upper end 18 has a hook and loop fastener near the uppermost edge. The hook portion 44 of the fastener is on an upper strap 46 that extends from the outer flap 38. The loop portion 50, to which the hook portion 44 may be releasably secured, is a band of loop material 50 sewn around the entire top of the tubular section 13. The loop portion 50 could also be simply the fabric layer 15 because the hook portion 44 is adapted for being releasably secured directly to the fabric layer 15. In the embodiment shown in FIGS. 5 and 6 the band of loop material 50 helps prevent tearing at the top of the tubular section 13 and fraying of the fabric layer 15.

The lower end 54 of the leg cover is sewn together as shown in FIG. 6. The material 17 of the tubular section 13 continues down to the lower end where it is folded into the seam 56 where the sides of the tubular section 13 are sewn together. A gripping portion 58 is located at the lower end 54 of the tubular section 13 and is made of material 60. The material 60 making up the gripping portion is the same as the material 17 making up the tubular section 13 and it has a fabric layer 62 and an elastomeric layer 64. The material 60 of the gripping portion 58 is positioned so that the fabric layer 62 faces the fabric layer 15 of the material 17 of the tubular section 13. This leaves the elastomeric layer 64 of the material 60 in the gripping portion facing outwardly. The material 60 of the gripping portion 58 is stitched into the seam 56 along with the inner and outer flaps 40, 38 to form a watertight termination to the entire leg cover 10. The upper edge 65 of the gripping portion 58 is stitched to the tubular section 13. Near the upper edge 65 of the gripping portion 58 is a lower strap 68. The lower strap 68 has a hook fastener 70 that is on its inner surface, facing the tubular section 13. Hook fastener 70 is adapted for releasably being secured to a loop fastener, and in the case of the lower strap 68, the loop fastener is the fabric layer 15 of the tubular section 13.

Figure 3:
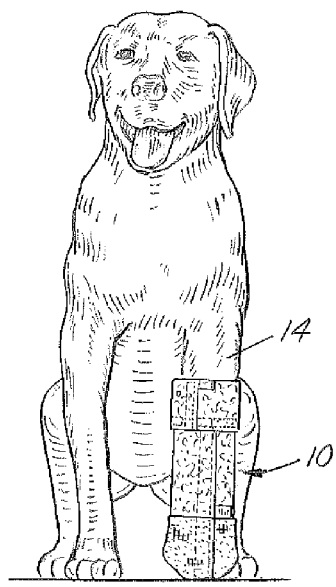
FIG. 3 is a front view of a larger sized dog using the leg cover with the adjustable collar.
Figure 4:
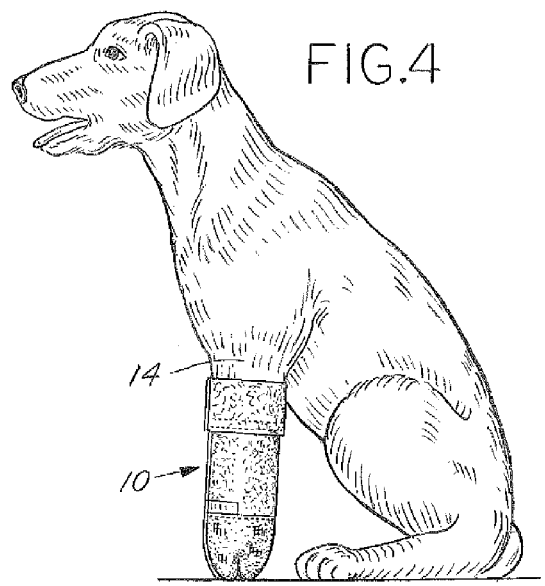
FIG. 4 is a side view of the dog in FIG. 3 using the leg cover with the adjustable collar.

An advantage of the fabric layer 15 on the tubular section 13 is that hook fasteners can be directly attached to the outer surface 20. This is useful for using an adjustable collar 80 that may be used to extend the length of the cover 10 to accommodate a longer length of leg 14 to be covered. Longer lengths may be necessary for larger dogs such as the one shown in FIGS. 3 and 4. The adjustable collar 80 is made from the same material as the tubular section 13 and gripping portion 58. FIG. 10 shows the adjustment collar opened flat, as viewed from what is the inner surface when wrapped around the tubular section 13, as shown in FIGS. 3 and 4. An elastomeric layer 84 has a lateral hook fastener 86 sewn adjacent to the lower edge 90 of the collar 80. A vertical hook fastener 88 is sewn onto the elastomeric layer 84 near an overlapping vertical edge 91 that is adapted for being wrapped in an overlapping fashion to cover the inner vertical edge 92. Another hook fastener 94 is on a strap 96 that extends from edge 91. The hook fastener 94 is adapted for being releasably secured to fabric layer 98 on the collar 80.

When a user of the leg cover 10 puts it on his pet, he will first open up the zipper 30 so that the leg 14 may be inserted into the cover 10. With the leg 14 in the cover 10, the zipper 30 will be pulled upward to close the mateable portions 32, 33. The upper and lower straps 46, 68 are then attached to the tubular portion 13. If necessary on a larger pet, as shown in FIGS. 3 and 4, the adjustable collar 80 may be used. The adjustable collar is wrapped around the tubular portion 13, as shown in FIG. 7. The hook fastener 86 may be placed so that it attaches to the fabric layer 15 of the tubular section 13, or so that the hook fastener 86 attaches to the band of loop material 50. The placement of the collar 80, with respect to the tubular portion 13, is chosen based on the length of legs 14 on the pet. Due to the construction of the fabric layer 15 on the tubular section, any of the hook fasteners, including hook fastener 86, may be readily attached directly to the fabric layer 15. The hook fastener 86 provides a covering over the tubular portion 13 that prevents water from running down the outside of the collar 80 into the tubular portion 13. The present invention, once placed on the pet, provides secure protection that will not easily fall off or be removed by the pet. The straps 46, 68 provide affirmative fastening to keep the outer flap 40 over the inner flap 38. The strap 96 on the collar provides additional security in the attachment beyond that of the vertical hook fastener 88.

The invention is not limited to the details above, but may be modified within the scope of the following claims.

What is claimed is:

1. An animal leg cover comprising:
    an elongate tubular section having an open upper end and a closed lower end and an outer surface, said tubular section being made from a material having an elastomeric waterproof layer facing inwardly and a fabric layer bonded to said elastomeric waterproof layer facing outwardly;
    said closed lower end of said tubular section having a gripping portion consisting of the same material as that of said tubular section, said material of said gripping portion having an elastomeric waterproof layer and a fabric layer bonded to said elastomeric waterproof layer so that said elastomeric waterproof layer of said gripping portion faces outwardly to form an outer surface of said gripping portion and said fabric layer of said gripping portion faces inwardly, contacting said fabric layer of said closed end of said tubular section, said tubular section having an outer flap overlapping an inner flap;
    a zipper having mateable portions is located in the tubular section, one of said mateable portions of said zipper on an inner surface of said outer flap of said tubular section and said other mateable portion of said zipper being on an outer surface of said inner flap of said tubular section, said outer flap of said tubular section overlapping said inner flap of said tubular section by a distance enough to completely cover said zipper when said mateable portions of said zipper are joined together;
    an upper strap near said upper end adapted for releasably being secured to said tubular section, said strap having an inner surface having a hook fastening device for mating with a corresponding loop fastening device near said upper end of said tubular section;
    a lower strap extending from said outer flap of said tubular section near said gripping portion and having a hook fastening device for mating directly to said fabric layer of said tubular section.

2. An animal leg cover as claimed in claim 1, wherein said hook fastening device on said upper strap is mateable with said fabric layer of said tubular section with said fabric layer serving as a loop portion on which said hook fastening device may be secured.

3. An animal leg cover as claimed in claim 2, further comprising an adjustable collar made of material having an elastomeric waterproof layer and a fabric layer bonded to said elastomeric waterproof layer, said collar having an upper edge, a lower edge and lateral edges, an inner surface of said collar having a hook fastener near said lower edge of said collar adapted for releasable securement to said fabric layer of said tubular section, a vertical hook fastener near one of said lateral edges adapted for releasable securement to said fabric layer of said collar, whereby said hook fastener near said lower edge of said collar may be secured at any position on said tubular section above said gripping portion.

4. An animal leg cover as claimed in claim 3, wherein said lateral edge adjacent said vertical hook fastener is adapted for overlapping said other lateral edge when said collar is wrapped in a position circumscribing said tubular section.

5. An animal leg cover claimed in claim 4, wherein a strap extends from said lateral edge adjacent said vertical hook fastener, said strap having a hook fastener on an inner surface adapted for releasable securement to said fabric layer of said collar.

* * * * *